United States Patent [19]

Ota et al.

[11] 4,380,035
[45] Apr. 12, 1983

[54] MAGNETIC TAPE CASSETTE

[75] Inventors: Hiroshi Ota; Eiji Horigome; Hitoshi Azegami, all of Tokyo, Japan

[73] Assignee: TDK Electronics Co., Ltd., Tokyo, Japan

[21] Appl. No.: 184,063

[22] Filed: Sep. 4, 1980

[30] Foreign Application Priority Data

Sep. 6, 1979 [JP] Japan .............................. 54-123156[U]

[51] Int. Cl.³ ............................................. G11B 23/04
[52] U.S. Cl. ............................. 360/130.33; 106/14.34; 252/387
[58] Field of Search ...................... 360/130.33, 130.32, 360/130.3, 130.31, 128; 252/387, 380, 383; 106/14.05, 14.15, 14.34, 14.35, 14.23, 14.24, 14.26; 260/29.2 R, 29.2 EP, 29.2 M

[56] References Cited

U.S. PATENT DOCUMENTS

| 3,093,492 | 6/1963 | Larsen | 106/14.35 |
| 3,216,956 | 11/1965 | Craig | 106/14.34 |
| 3,851,115 | 11/1974 | Zacaroli | 360/130.33 |
| 3,933,715 | 1/1976 | Botsch | 252/380 |
| 4,089,796 | 5/1978 | Harris et al. | 252/387 |

FOREIGN PATENT DOCUMENTS

| 994409 | 6/1965 | United Kingdom | 106/14.34 |
| 1226100 | 3/1974 | United Kingdom | 106/14.34 |
| 2032389 | 5/1980 | United Kingdom | 360/130.33 |

Primary Examiner—Alfred H. Eddleman
Attorney, Agent, or Firm—Oblon, Fisher, Spivak, McClelland & Maier

[57] ABSTRACT

A magnetic tape cassette comprises a pad support membrane made of a metal alloy such as bronze and nickel silver. The pad support membrane is coated with a synthetic resin layer containing a rust inhibitor.

5 Claims, 2 Drawing Figures

MAGNETIC TAPE CASSETTE

BACKGROUND OF THE INVENTION

1. Field of the Invention

The present invention relates to a magnetic tape cassette. More particularly, it relates to a structure of a pad support member placed in an opening for inserting a head.

2. Description of the Prior Art

As shown in FIG. 1, a pad (4) is usually placed along a running direction of a magnetic tape (3) in an opening for inserting a head which is formed in the middle of a cassette casing (1) in a conventional magnetic tape cassette. The pad (4) is usually formed by bonding a buffering element (6) made of an elastic material such as a urethane foam on a surface of a pad support member (5) as a resilient plate made of a metal alloy such as phosphor bronze or, nickel silver. The magnetic tape (3) is pushed on a recording and reproducing head (7) under the resilient force of the pad support member (5) and the buffering force of the buffering element (6) to operate read-out and write-in of magnetic record. The references (8) and (9) respectively designate stems for holding the pad support member (5) and the stems are projected from an inner surface of the cassette casing (1). A magnetic shield plate (10) is placed to cover the pad support member (5).

When the pad support member (5) is prepared by punching a plate made of phosphor bronze or nickel silver, the plate is easily oxidized in air to form rust. Certain panel characteristics deteriorate and mechanical strength deteriorates to cause damage on the surface of the magnetic tape (3) and to remarkably decrease reliability. A magnetic tape cassette is often exposed to an environment of high temperature and high humidity as it is used as a car stereo tape cassette which has come into wide use. Therefore, it is important to prevent rusting of the pad support member. It has been considered to plate a metal on the pad support member, however it causes high cost and change of mechanical characteristics especially spring characteristic of the pad support member.

SUMMARY OF THE INVENTION

It is an object of the present invention to provide a magnetic tape cassette in which a formation of rust on a pad support member is substantially prevented without changing mechanical characteristics of the pad support membrane made of a metal alloy such as phosphor bronze.

The foregoing and other objects have been attained by providing a magnetic tape cassette which comprises a pad support member coated with a synthetic resin comprising a rust inhibitor.

DETAILED DESCRIPTION OF THE PREFERRED EMBODIMENTS

Figure 1:
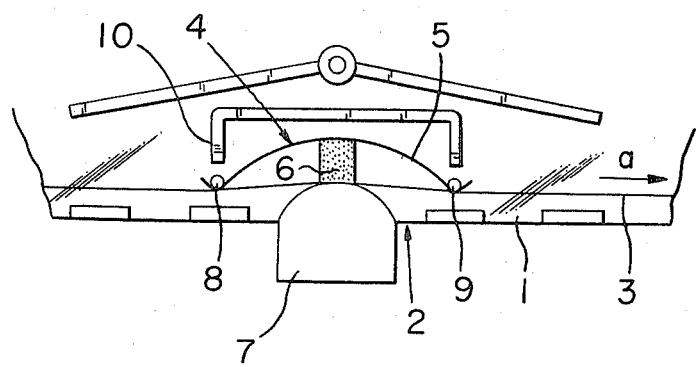
FIG. 1 is a partially enlarged sectional view of a pad part of a magnetic tape cassette.
Figure 2:
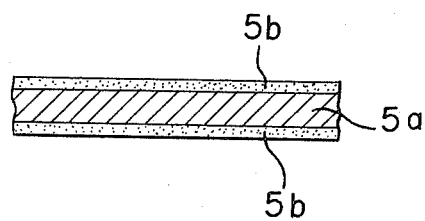
FIG. 2 is a sectional view of a pad support member used in the magnetic tape cassette of the present invention.

In accordance with the present invention, a synthetic resin is dissolved or dispersed in an organic solvent to form a coating composition and a rust inhibitor is blended to the coating composition, and the resulting composition is coated on the surface of the substrate of the pad support member made of a metal alloy such as phosphor bronze or nickel silver and is cured by heat-curing or curing at the ambient temperature, whereby a synthetic resin film (5b) containing the rust inhibitor is formed on the substrate (5a).

In such structure, the rusting of the substrate can be substantially prevented without changing mechanical characteristics of the substrate (5a) made of the metal alloy such as phosphor bronze.

Suitable rust inhibitors include organic compounds having a polar group especially nitrogen-containing organic compounds such as organic amines, imides, azoles, thiazoles and esters. These rust inhibitors can be selected from the known rust inhibitors. The rust inhibitor is incorporated into the synthetic resin to be effective for preventing the rusting.

The thickness of the synthetic resin coated layer is usually in a range of 0.1 to $10\mu$ preferably 0.2 to $5\mu$ especially 0.2 to $2\mu$. The rust inhibitor sometimes is a component of the synthetic resin. The synthetic resin can be selected from the conventional resins for coating films especially, polyesters and polyurethanes.

The present invention will be further illustrated by certain examples and references which are provided for purposes of illustration only.

Coating compositions A, B and C were prepared by blending the following components:

| Composition A: | |
| --- | --- |
| Polyester resin (Desmophen 800 manufactured by Nippon Polyurethane Co.) | 10 wt. parts |
| Polyester resin (Desmophen 2200 manufactured by Nippon Polyurethane Co.) | 10 wt. parts |
| Benzothiazole (manufactured by Sumitomo Chemical Co.) | 1 wt. parts |
| Methyl ethyl ketone (MEK) | 150 wt. parts |
| Methyl isobutyl ketone (MIBK) | 150 wt. parts |
| Toluene | 150 wt. parts |
| Composition B: | |
| Polyester resin (Desmophen 800 manufactured by Nippon Polyurethane Co.) | 10 wt. parts |
| Polyurethane resin (Nippolan 5033 manufactured by Nippon Polyurethane Co.) | 10 wt. parts |
| Benzotriazole (manufactured by Tokyo Kasei Kogyo K.K.) | 1 wt. parts |
| Methyl ethyl ketone (MEK) | 150 wt. parts |
| Methyl isobutyl ketone (MIBK) | 150 wt. parts |
| Toluene | 150 wt. parts |
| Composition C: | |
| Polyester resin (Desmophen 1100 manufactured by Nippon Polyurethane Co.) | 10 wt. parts |
| Polyester resin (Desmophen 1800 manufactured by Sumitomo Bayer Co.) | 10 wt. parts |
| Benzothiazole (manufactured by Tokyo Kasei Kogyo K.K.) | 1 wt. parts |
| Methyl ethyl ketone (MEK) | 150 wt. parts |
| Methyl isobutyl ketone (MIBK) | 100 wt. parts |
| Toluene | 150 wt. parts |

The components of Composition C were mixed and kneaded and then 0.5 wt. part of a polyfunctional aromatic isocyanate (Desmodule L manufactured by Sumitomo Bayer Urethane Co.) was admixed and the mixture was thoroughly mixed to prepare a coating composition. The coating composition was coated on a phosphor bronze plate and dried and cured. The coated phosphor bronze plate was punched to prepare a pad support member.

Each pad support member was also prepared by the same process except using Composition B or C.

Pad pressures of the pad support members prepared by the invention using Composition A; the conventional pad support member made of phosphor bronze (non-treatment) and the pad support members made of phosphor bronze plated with tin or nickel were compared. The results are shown in Table 1.

TABLE 1

| Pad sample | Pad pressure (g/cm$^2$) |
|---|---|
| Phosphor bronze (non-coated) | 11 |
| Phosphor bronze |  |
| (tin plating: 0.5μ) | 16 |
| (tin plating: 1.0μ) | 19 |
| (nickel plating: 0.5μ) | 15 |
| (nickel plating: 1.0μ) | 18 |
| Phosphor bronze |  |
| (coated with Composition A: 0.2μ) | 11 |
| (coated with Composition A: 0.5μ) | 11 |
| (coated with Composition A: 1.0μ) | 11.5 |

As it is clearly understood from the results shown in Table 1, the pad support member of the present invention had the pad pressure being substantially the same as that of the non-coated phosphor bronze plate (11 g/cm$^2$). The mechanical characteristics of the phosphor bronze as the substrate is not substantially changed. When Composition B or C is coated, the same effect can be obtained.

On the other hand, when the phosphor bronze plate was plated with tin or nickel, the pad pressure is changed to 15 to 19 g/cm$^2$ and the mechanical characteristics of the phosphor bronze plate is remarkably changed.

The coated layer (5b) incorporates the rust inhibitor whereby the rusting of the phosphor bronze plate can be prevented.

As described above, in accordance with the present invention, the magnetic tape cassette comprises the pad support membrane coated with a synthetic resin containing the rust inhibitor. The rusting can be substantially prevented without changing mechanical characteristics of the substrate of the pad support membrane made of phosphor bronze etc. This can be prepared only by coating a synthetic resin coating composition containing the rust inhibitor, on the substrate made of phosphor bronze and drying and curing it whereby the costs for the preparation and the materials are remarkably low to attain remarkable cost-down.

We claim:

1. A magnetic tape cassette, which comprises: a resilient, coated pad support member having a coat formed from an organic solvent soluble rust inhibitor and an organic solvent soluble synthetic resin, wherein said coated pad support member produces a pad pressure substantially the same as the pressure produced when said pad support member is uncoated.

2. The magnetic tape cassette according to claim 1 wherein said synthetic resin is a cured synthetic resin.

3. The magnetic tape cassette according to claim 1 wherein said rust inhibitor is benzotriazole or benzothiazole.

4. The magnetic tape cassette according to claim 1 wherein said synthetic resin layer containing said rust inhibitor is coated on said pad support membrane made of a metal alloy of bronze or nickel silver.

5. The magnetic tape cassette according to claim 1, wherein the thickness of the coated layer is 0.2 to 5μ.

* * * * *